Aug. 12, 1941.  K. KOEHL  2,252,513
ROTATABLE PROJECTION ASSEMBLY
Filed June 14, 1939  2 Sheets—Sheet 1
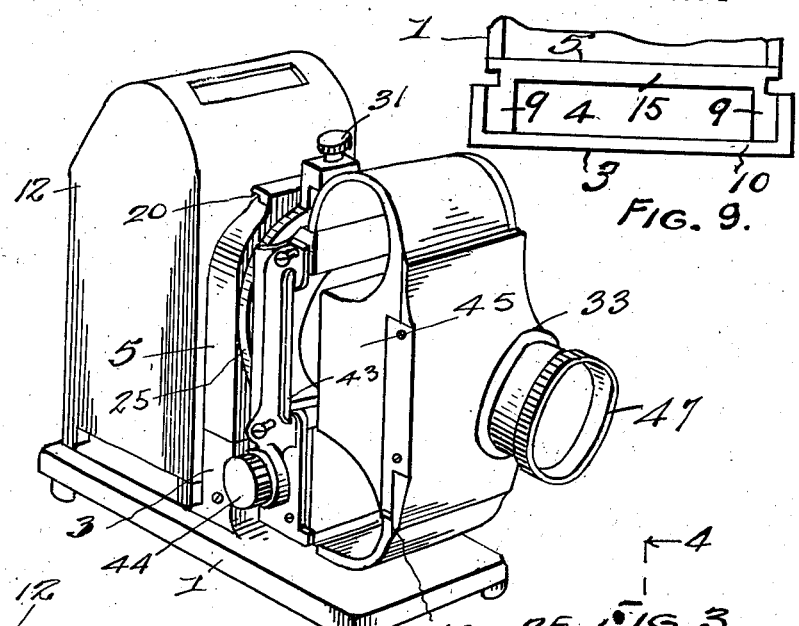
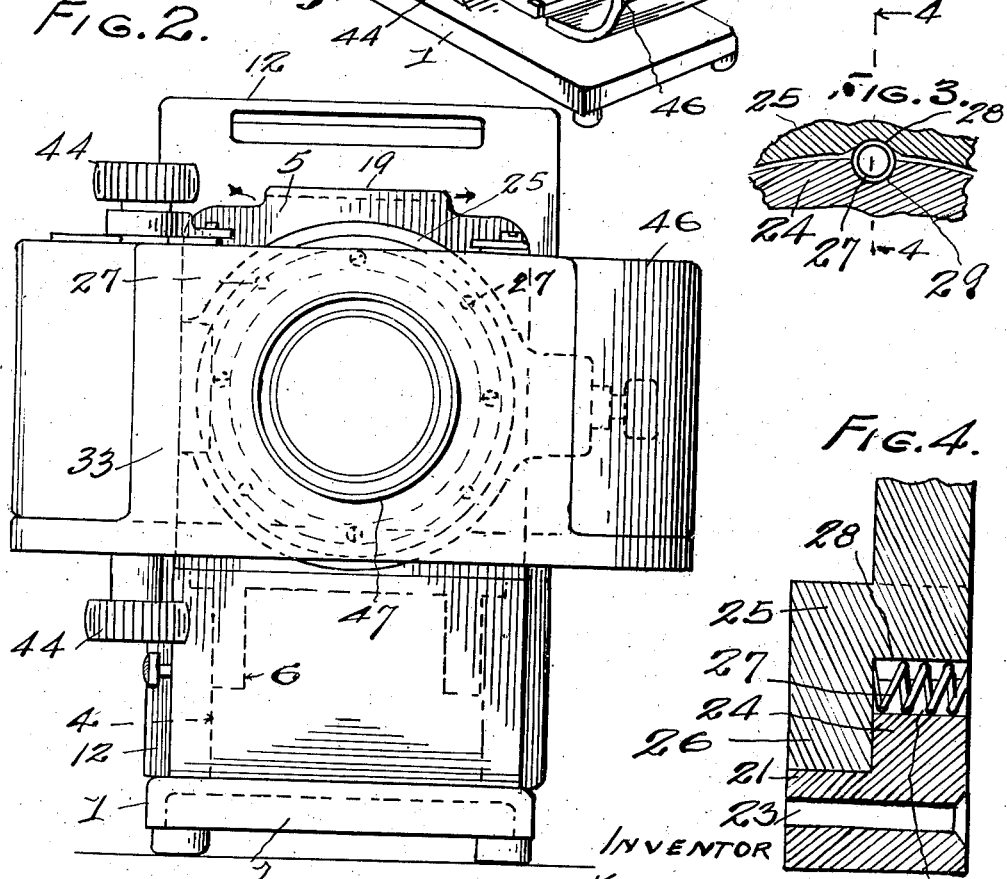
INVENTOR
KONRAD KOEHL
By Chas. K. Davies + Son
Attys.

Aug. 12, 1941.     K. KOEHL     2,252,513
ROTATABLE PROJECTION ASSEMBLY
Filed June 14, 1939     2 Sheets-Sheet 2

INVENTOR
KONRAD KOEHL
Chas K. Davies + Son
Attys.

Patented Aug. 12, 1941

2,252,513

UNITED STATES PATENT OFFICE 2,252,513

ROTATABLE PROJECTION ASSEMBLY

Konrad Koehl, Dresden, Germany, assignor to Ihagee Kamerawerk Steenbergen & Company, Dresden, Germany Application June 14, 1939, Serial No. 279,205

7 Claims. (Cl. 88—24)

My present invention relates to an improved rotatable projection assembly as embodied in a portable, optical, projecting apparatus, or projector, used for displaying, as well as for enlarging, images or objects, real pictures, photographs, etc., from a film-strip usually of miniature size, or a photographic plate, upon a screen or other suitable surface.

This application for patent is a continuation in part of the invention illustrated and claimed in my co-pending application for patent Serial Number 199,296, filed March 31, 1938.

The present invention is particularly directed to the association of a specific type of stationary base or support with a demountable, and rotatably adjusted head of the projector, and to combinations and arrangements of these parts and their accessories, by means of which the assembly may with facility function properly and accurately in carrying out the purposes of its various parts. I provide a projector in which the parts are compactly and conveniently arranged, and which is adapted, by easy manipulation, to display either vertical or horizontal groups of pictures on a film-strip, as required; and in addition photographic plates may successively be fed to the projector for enlargement or display upon a screen. The feeding arrangements for winding a film-strip, or for the insertion of a single photographic plate, are mounted in the demountable and rotatably adjustable head of the projector, so that ready access may be had to interior parts of the projector, and especially to the joint between the rotary head of the projector and the body or base of the projector.

As an example of the utility of the rotatable projection assembly, it frequently happens in photography that a single picture in a film-strip bearing a series of pictures has been taken upside down, and consequently the single picture is out of position with relation to the remaining exposures or pictures on the film-strip. Under such conditions it is not necessary to remove the film-strip, nor disturb the winding mechanism, for the reason that, due to the swivel joint between the rotatable projector-head and the projector base or support for the head, the rotatable head may with facility be turned to bring the "out-of-position" picture into the plane formerly occupied by the remaining pictures on the film-strip. After the single picture has been displayed, the swiveled head may with equal facility be restored to position for displaying the pictures of the film-strip in their natural positions.

As the swiveled joint is here arranged the rotatable head may be turned, step-by-step, with four automatic stops through a cycle of three hundred and sixty degrees.

Because of the high degree of light output permitted from the illuminating lamp, the instrument is especially adapted for the projection of colored images on miniature film-strips, and, in addition to the usual venting of the lamp housing or casing, I provide for circulation of air or ventilation through the swivel joint, for the protection of the triple condenser and other parts mounted in an enclosed chamber extending along the optical axis of the projector.

Figure 1 is a perspective view of a projector embodying my invention, with the demountable and rotatably adjustable head in vertical or upright position, for winding a film-strip in a vertical plane through the projector head, as well as for inserting a plate along a horizontal plane.

Figure 2 is an enlarged front view of the projector, with the rotary head turned through an angle of ninety degrees to a horizontal position, for horizontal feed of the film-strip, and for dropping a photographic plate into its receiver, through a vertical plane.

Figure 3 is an enlarged, detail sectional view, showing parts of the fixed head, and the rotary or swiveled head, with one of the snap fasteners or springs for holding the rotary head in adjusted position.

Figure 4 is a sectional detail view, as at line 4—4 of Figure 3, showing a snap-fastener between a portion of the base or supporting ring and a portion of the swivel ring which turns with the rotary head.

Figure 9 is a top view of the fixed cross head, rigid with the base or support of the projector, and adapted to receive the separable head block.

Figure 5:
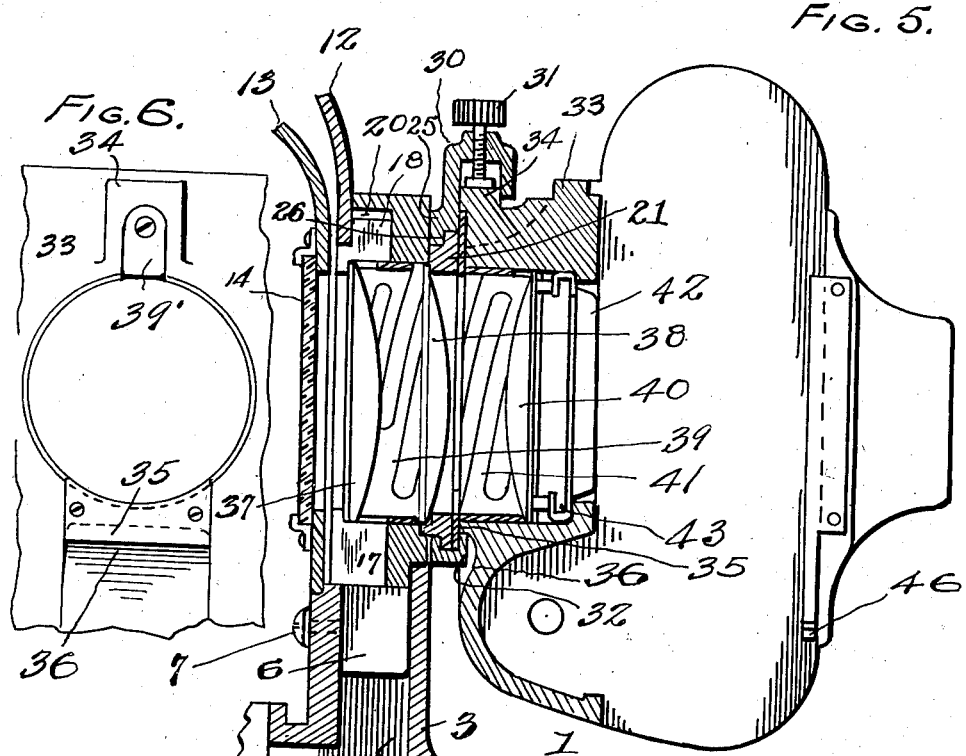
Figure 5 is a longitudinal sectional view along the optical axis of the projector, showing the condenser chamber extending longitudinally along the optical axis of the projector; the swivel joint, the rotary head locked to the swivel ring, and also showing the venting arrangements for the condenser chamber at the swivel joint.

In the assembly views 1 and 2 it will be seen that the projector is fashioned with a horizontal base 1 which may rest upon a table or other suitable support, or the projector may be supported from a tripod or standard through the use of the nut 2 fixed at the underside of the base. On the top of the longitudinally extending rectangular base is mounted a transversely extending rectangular flange forming a hollow cross head with an interior venting flue 4 open at its top to the atmosphere, and also open at its bottom end through the base to the atmosphere for circulation of air, as best seen in Figures 5 and 9.

This hollow cross head, rigid with or integral with the base 1, supports a separable head block 5, which has a pair of spaced legs 6, 6, that fit neatly into the walls of the flue 4, and set screws 7 are employed for rigidly holding the apertured head block in place on the top of the cross head. The front face of the head-block is grooved as at 8, and this bottom groove extends around the opposite side edges of the block as at 9, 9, and this grooved bottom or extension of the head-block rests upon the upper edge 10 and the two end edges of the cross head, to provide with the screws 7 a rigid support of the head block on the cross-head.

Figure 8:
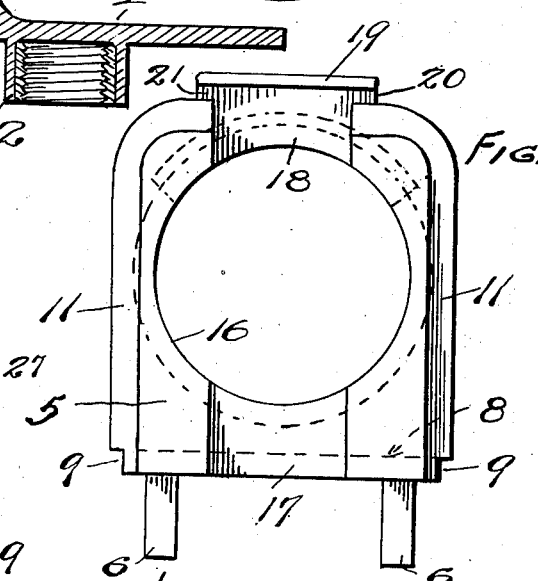
Figure 8 is a rear view as seen from the left in Figure 5 of the separable head block on which the rotary head is mounted, showing especially the venting flues of the apertured head-block.

In Figure 8 it will be seen that the rear face of the head-block is provided with two vertical edge grooves 11, 11, which near the top of the head-block extend laterally and inwardly, and the exterior lamp casing 12 has a front opening with the edges of its walls fitted in these grooves of the head-block. This exterior lamp casing encloses an interior lamp housing 13 part of which is shown in Figure 5, and the front open wall of this interior housing is provided with a front glass window 14, alined with the optical axis of the projector, as is also the lamp and mirror (not shown) in the lamp housing. The interior housing 13 has the bottom edge of its front wall seated on the edge 15 of the cross-head. In this manner the circular aperture 16 of the head-block is shut off from heat in the interior of the lamp housing and lamp casing, which are ventilated as usual, and in addition an updraft or circulation of air is provided through two central, vertical slots 17 and 18, one below and the other above the aperture 16 of the head block.

At the top of the head block a rearwardly extending cowl 19 is provided, directly over the slot or flue 18 at the rear of the headblock, and lateral outlet ports 20 beneath the cowl provide for circulation of air and ventilation along the optical center of the head block and of the instrument. The heated air passing through the outlet ports induces currents of air at room temperature from the bottom of the flue 4 of the cross head to pass upwardly through the slots or flues 17 and 18, thus ventilating the interior of the instrument and protecting the parts along the optical axis of the projector.

Figure 7:
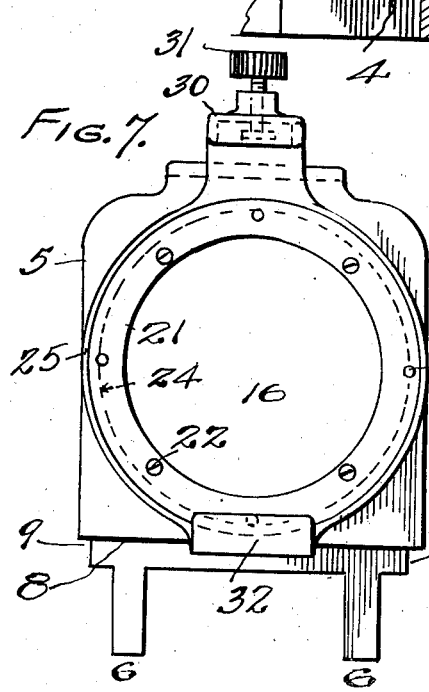
Figure 7 is a front face view, looking to the left in Figure 5 showing the swivel ring and the base or retaining ring therefor.

The head block 5 forms the supporting member for the rotary front portion of the projector, and provides on its front face the swivel joint connection of the demountable and rotatably adjustable head of the projector. As best seen in Figure 7 on the front face of the head-block is mounted a fixed base ring 21 of the swivel joint, and the base ring is fashioned with screw-holes 23 (Fig. 4) for the attaching screws 22 which secure the base ring to the head-block. The base ring is fashioned with a front annular and inner flange 24 that provides a rear, inner groove, and the flange and groove confine the relatively rotatable, or swivel ring 25 of the joint. The swivel ring is fashioned with an annular flange 26 that is retained by the flange 24 of the base or fixed ring, and the swivel ring is rotatable with the rotatable head of the projector, as a whole, when the projector head is locked to the swivel ring, and in addition, co-acting means on the base ring and the swivel ring in the nature or resilient snap-fasteners, here shown as four in number are utilized for securing the projector head in any one of four positions with relation to the head-block.

Each of these snap fasteners, as best seen in Figures 3 and 4 comprises a coiled spring 27 that is located in a recess formed by complementary notches 28 and 29 in the outer periphery of the swivel ring 25, and the inner periphery of the base ring 24, and these springs are so arranged in their recesses that the force applied for rotating the projector head is sufficient to crush or ride down the springs so that the swivel ring may be turned, step by step. Thus in Figure 2 the rotary projector head has been turned through an angle of ninety degrees from the position of Figure 1, and the four diametrically arranged snap fasteners are holding the projector head in horizontal position as differentiated from the vertical position of Figure 1. The springs 27 are crushed and ridden over by the swivel ring so that the latter may be turned step by step, and is automatically stopped and retained at any one of the four diametrical points. The springs of course expand from their crushed positions as the notches 28 register with the springs and form the complete recesses in which the stop springs expand.

Figure 6:
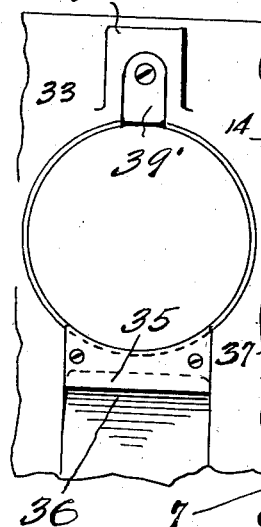
Figure 6 is a fragmentary inner face view looking to the right in Figure 5 and showing joint-locking means on the rotary head.

For convenience in attaching the projector head to the swivel ring, and for detaching or dismounting the projector head from the swivel ring, which is mounted on the head block, the swivel ring 25, as best seen in Figures 6 and 7, is fashioned with an exterior, radially projecting hollow-head or socket 30, and a radially projecting locking screw 31 is mounted in the socket-head. Diametrically opposite the socket-head and its screw the swivel ring is fashioned with a tangentially extending locking lip 32. The screw and its socket head and the locking lip of the swivel ring are employed in connection with complementary locking means on the rear face of the rotary projector head, as best seen in Figure 6. Here the head 33 is provided with a locking lug 34 of proper size and shape as to fit in the socket-head 30 of the swivel ring, and a transversely extending locking plate 35 attached by screws diametrically opposite to the lug is rigid with the projector head.

At 36, Figs. 5 and 6 the rear face of the projector head 33 is cut out or grooved, to form a socket or recess for the locking lip 32 of the swivel ring. Thus in Figure 5 it will be seen that the rotary projector head is firmly attached to the swivel ring by pressure of the screw 31 on the lug 34 which has forced the projector head downwardly so that the plate 35 is tightly held up in the recess 36 with the lug 32 engaging around the lock plate 35.

To release the projector head 33 from the swivel ring and the supporting head block so that the rotary adjustable head may be dismounted, the screw 31 is turned back up into the socket-head 30, thus permitting the rotary head 33 to be bodily lifted to disengage the lip 32 from the locking plate 35. Then by an outward and downward swing of the projector head, the latter is detached from the head-block, or the swivel ring mounted thereon.

To attach the rotary projector head, with the screw 31 turned back to its limit, the lug 34 is first slipped into the socket-head and the rotary head is swung backwardly so that the locking plate 35 passes over the locking lip, then the head is bodily lowered so that the locking lip and locking plate are engaged, and by turning the locking screw down tight on the lug 34, the rotary head is rigidly held on the swivel ring.

The apertures of the head block and the rotary projector head are alined with the optical axis of the instrument, and a triple condenser comprising lenses 37 and 38 mounted in the head block and spaced by spreaders or annular springs 39; and the third lens of the condenser, as 40 is separately mounted in the rotary head 33 and retained by a spring 41. In Fig. 6 the spring 39 is shown as being retained in position by a retaining plate 39' attached to the lug 34 on the rear face of the rotary projector head.

A resiliently supported guide plate 42 for a film is shown in Figure 5, and this plate forms a presser plate for use with another guide plate when a film of pictures is being projected; and the pocket 43 back of the presser plate is adapted to receive photographic plates or slides when they are used.

The exposure-projection apertures of the head block together with the aperture of the projector-head form an enclosed condenser chamber that extends longitudinally along the optical axis of the projector. The two lenses 37 and 38, as before stated, are located in the exposure-projection aperture of the head block, and the lens 40, which completes the condenser system is located in the exposure-projection aperture of the projector-head. The rear vented end of the chamber is closed from the interior of the lamp housing by means of the plate glass window 14, and the front or outer end of the chamber is closed by the presser plate 42.

A part of the winding mechanism for the film is indicated at 44, and in Figure 5 it will be seen that the rotary head has an open pocket to receive the apertured film housing 45 shown in Figures 1 and 2, and retained in the pocket by a spring latch 46. The lens mount 47 is located as usual at the front of the rotary head. Other parts of the projector disclosed on the drawings are not necessary for a clear understanding of the invention, and therefore no detailed reference is made to them.

Having thus fully described my invention, what I claim as new and desire to secure by Letters Patent is:

1. In a rotatable projector assembly, the combination with a base having an upright hollow cross-head forming a vent-flue, an apertured head-block having a lower vent flue and rigidly mounted in the cross-head, said head block having also an upper vent flue terminating in outlet ports whereby the projection-aperture is ventilated, a rotatable adjustable apertured projector head mounted on the head block, means for retaining said head in adjusted position said apertured head-block and projector head forming an enclosed condenser chamber, and a condenser system in said chamber.

2. In a rotatable projector assembly, the combination with a base having a hollow cross head forming an open upright flue, a head-block rigidly mounted in the cross head and provided with a central aperture, said head-block also having deep-slots forming flues above and below said aperture, a cowl over the upper flue forming air outlets, a portion of the projector closing the rear openings of the flues, a rotatable adjustable projector head having a projection aperture alined with the aperture of the head-block said apertures forming an enclosed chamber and a condenser system in said chamber.

3. In a rotatable projection assembly, the combination with a rigid apertured head-block having a base ring secured thereon, of a swivel ring mounted on the base ring, a rotary apertured projector head, diametrically opposed locking means on said swivel ring and the projector head for locking the projector head with the swivel ring said head-block and projector head forming an enclosed condenser chamber, and a condenser system in said chamber.

4. In a rotatable projection assembly, the combination with a hollow cross-head, a separable apertured head-block mounted on the cross head, spaced legs on said head-block located in said hollow cross head, means for rigidly securing the head-block in said cross head, a base ring having a central aperture and secured to said head-block, and a swivel ring mounted on the base ring of an apertured rotary projector head having a rear recess and a locking plate, an overlapping lip on the swivel ring engaging said plate and projecting into said recess, a locking lug on the projector head diametrically opposite the locking plate, an off-set socket-head on the projector head fitted over said lug, and a set screw in the socket-head engaging said lug.

5. In a rotatable projection assembly, the combination with a head-block having a projection aperture, and a base ring having an annular flange with spaced peripheral notches, of a flanged swivel-ring rotatably mounted on the base ring and having complementary peripheral notches co-acting with the first mentioned notches to form cylindrical sockets, an apertured projector head and means for mounting said head on the swivel ring, longitudinally extending coiled-springs located in said sockets to form resilient stops said head-block and projector head forming an enclosed condenser chamber, and a condenser system in said chamber.

6. In a projector assembly, the combination with a supporting body having a projection aperture, of a rotatively adjustable and demountable projection head also having a projection aperture, said apertures forming an enclosed condenser chamber and a condenser system in said chamber extending longitudinally along the optical axis of the projector, a lip on said head supported on the body and a diametrically opposed socket on the body overlying the head, means for retaining the head and body in fixed relation, and means for retaining said head in adjusted position.

7. In a projector assembly, the combination with a supporting body having a projection aperture, of a rotatively adjustable demountable projection head also having a projection aperture, said apertures forming an enclosed condenser chamber and a condenser system in said chamber extending longitudinally along the optical axis of the projector, a lip on said head supported on the body and a diametrically opposed socket on the body overlying the head, means for retaining the head and body in fixed relation, and resilient stop means mounted between the head and body for automatically holding the head in rotatively adjusted position.

KONRAD KOEHL.